United States Patent
Won et al.

(10) Patent No.: US 9,444,282 B2
(45) Date of Patent: Sep. 13, 2016

(54) WIRELESS POWER CHARGING METHOD AND APPARATUS

(75) Inventors: Eun-Tae Won, Seoul (KR); Seung-Hoon Park, Seoul (KR); Joon-Ho Park, Seoul (KR); Jun-Ho Koh, Gyeonggi-do (KR); Hee-Won Jung, Gyeonggi-do (KR); Noh-Gyoung Kang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 876 days.

(21) Appl. No.: 13/047,326

(22) Filed: Mar. 14, 2011

(65) Prior Publication Data

US 2011/0221390 A1    Sep. 15, 2011

(30) Foreign Application Priority Data

Mar. 12, 2010 (KR) .................. 10-2010-0022535
Jul. 16, 2010 (KR) .................. 10-2010-0069208

(51) Int. Cl.
*H02J 7/00* (2006.01)
*H02J 7/02* (2016.01)
*H02J 17/00* (2006.01)

(52) U.S. Cl.
CPC .............. *H02J 7/025* (2013.01); *H02J 7/0054* (2013.01); *H02J 17/00* (2013.01); *H02J 50/00* (2016.02); *H02J 50/10* (2016.02)

(58) Field of Classification Search
CPC ........ H02J 7/025; H02J 7/0054; H02J 17/00; H02J 50/00; H02J 50/10
USPC ......................................... 320/108; 455/41.1
See application file for complete search history.

(56) References Cited

U.S. PATENT DOCUMENTS

| | | | |
|---|---|---|---|
| 6,437,685 | B2 | 8/2002 | Hanaki |
| 8,099,140 | B2 * | 1/2012 | Arai .............................. 455/573 |
| 8,332,547 | B2 | 12/2012 | Sugaya |
| 2003/0178967 | A1 | 9/2003 | Khatri |
| 2004/0142733 | A1 | 7/2004 | Parise |
| 2005/0194926 | A1 | 9/2005 | Di Stefano |

(Continued)

FOREIGN PATENT DOCUMENTS

| | | |
|---|---|---|
| CN | 1956288 | 5/2007 |
| CN | 101401322 | 4/2009 |

(Continued)

OTHER PUBLICATIONS

Machine English Translation performed on Feb. 27, 2014 for JP2007158590, 17 pages.*

(Continued)

*Primary Examiner* — Nathaniel Pelton
(74) *Attorney, Agent, or Firm* — The Farrell Law Firm, P.C.

(57) ABSTRACT

A wireless charging method and apparatus wirelessly charges power between separate electronic appliances. The wireless charging method includes searching for at least one chargeable electronic device, receiving status information from the searched at least one electronic device, determining whether the electronic device is a power supply electronic device or a power demand electronic device, receiving a supply of power from the searched at least one electronic device if the electronic device is determined to be the power demand electronic device, and supplying the power to the at least one electronic device if the electronic device is determined to be the power supply electronic device.

22 Claims, 9 Drawing Sheets

(56) References Cited

U.S. PATENT DOCUMENTS

| | | | |
|---|---|---|---|
| 2007/0103110 A1* | 5/2007 | Sagoo | 320/109 |
| 2007/0135182 A1 | 6/2007 | Hanif et al. | |
| 2007/0139000 A1* | 6/2007 | Kozuma et al. | 320/108 |
| 2007/0178945 A1 | 8/2007 | Cook et al. | |
| 2009/0033280 A1* | 2/2009 | Choi | H02J 7/025 320/108 |
| 2009/0140690 A1 | 6/2009 | Jung | |
| 2009/0251008 A1 | 10/2009 | Sugaya | |
| 2010/0171461 A1* | 7/2010 | Baarman et al. | 320/108 |
| 2010/0201313 A1* | 8/2010 | Vorenkamp et al. | 320/108 |
| 2010/0225272 A1* | 9/2010 | Kirby | H04B 5/00 320/108 |
| 2011/0043163 A1* | 2/2011 | Baarman | 320/108 |

FOREIGN PATENT DOCUMENTS

| | | |
|---|---|---|
| CN | 101552481 | 10/2009 |
| EP | 1 780 863 | 5/2007 |
| JP | 09-103037 | 4/1997 |
| JP | 2004-222457 | 8/2004 |
| JP | 2005-151609 | 6/2005 |
| JP | 2005-168085 | 6/2005 |
| JP | 2006-087214 | 3/2006 |
| JP | 2006-141170 | 6/2006 |
| JP | 2007-124890 | 5/2007 |
| JP | 2007-158590 | 6/2007 |
| JP | 2007-166960 | 6/2007 |
| JP | 2007158590 | * 6/2007 |
| JP | 2009-251895 | 10/2009 |
| KR | 1020080106186 | 12/2008 |
| KR | 1020090056546 | 6/2009 |

OTHER PUBLICATIONS

Chinese Office Action dated Dec. 16, 2014 issued in counterpart Application No. 201180013674.X.

European Search Report dated Oct. 5, 2015 issued in counterpart Application No. 11753615.1-1804, 8 pages.

* cited by examiner

WIRELESS POWER CHARGING METHOD AND APPARATUS

PRIORITY

This application claims priority under 35 U.S.C. §119(a) to applications entitled "Wireless Power Charging Method And Apparatus" filed in the Korean Industrial Property Office on Mar. 12, 2010 & Jul. 16, 2010, and assigned Serial Nos. 10-2010-0022535 & 10-2010-0069208, the contents of which are incorporated herein by reference.

BACKGROUND OF THE INVENTION

1. Field of the Invention

The present invention relates generally to a power charging method and apparatus, and more particularly to a method and apparatus for wirelessly charging power.

2. Description of the Related Art

Wireless charging technology is used to wirelessly supply and demand power without any connector for power transfer. The wireless charging technology is classified into an electromagnetic induction type using a coil, a wireless power transmission type converting an electric energy into a microwave to transfer the power, a type using resonance, and the like. The electromagnetic induction type power charging technology has conventionally been the mainstream, but recently, experiments in which the power is wirelessly transmitted within several tens of meters using microwaves have been successful at home and abroad. Thus, it is expected that an environment in which all electronic devices can be wirelessly charged anywhere and anytime will be realized in the near future.

The electromagnetic induction type transmits the power between a primary coil and a secondary coil using a property in that current is induced through movement of a magnet against a coil to generate the electricity. That is, a transmitting end generates a magnetic field, and a receiving end serves as a magnet to produce energy. This phenomenon is called magnetic induction. Since the electromagnetic induction type has excellent energy transmission efficiency, it has been widely commercialized, and applied to diverse devices such as electric shavers and electric toothbrushes, using nickel batteries.

The resonance type uses the resonance characteristics of an electromagnetic wave. Since this resonating electromagnetic wave is directly transferred only when a device having the resonance frequency exists and a portion that is not in use is reabsorbed into the electromagnetic field instead of spreading in the air, it is expected that the resonating electromagnetic wave will exert no influence on surrounding machines or human bodies, unlike other electromagnetic waves. The resonance type was previewed by a Massachusetts Institute of Technology (MIT) research team in 2005.

An RF/microwave radiation type is a power transmission type that transfers energy through a conversion of the power energy into a microwave that is favorable to the wireless transmission. The power transmission is to transmit the electric energy rather than a signal that is used in a wireless communication type such as a radio receiver, a wireless phone, or the like. That is, whereas a typical communication is to transmit a signal that is carried on a carrier signal, the wireless power transmission transmits only the carrier.

The wireless charging technology has been applied to wireless electric toothbrushes or wireless shavers. Also, a charging system which can automatically charge a battery that is put on a charging pad without connecting a separate charging connector to a portable phone may be exemplified. Such a wireless charging technology can heighten the waterproof function by wirelessly charging the electronic device, and heighten the portability of the electronic device since it does not require a wired charger.

A wireless charging system to which the above-described wireless charging technology is applied is provided with a power supply stand from which the power is supplied to a terminal. Thus, it has the disadvantage that the wireless charging becomes possible only in a location where the power supply stand is provided.

SUMMARY OF THE INVENTION

Accordingly, the present invention has been made to solve the above-mentioned problems occurring in the prior art, and the present invention discloses a wireless charging method and apparatus which can wirelessly charge an electronic device even without a support for supplying the power.

Also, the present invention discloses a wireless charging method and apparatus which can wirelessly supply and demand the power in accordance with the power state of an electronic device.

In accordance with an aspect of the present invention, there is provided a wireless charging method for an electronic device, which includes searching for at least one chargeable electronic device, receiving status information from the searched at least one electronic device, determining whether the electronic device is a power supply electronic device or a power demand electronic device, and receiving a supply of power from the searched at least one electronic device if the electronic device is determined to be the power demand electronic device.

The wireless charging method according to an embodiment of the present invention further includes supplying the power to the searched at least one electronic device if the electronic device is determined to be the power supply electronic device.

BRIEF DESCRIPTION OF THE DRAWINGS

The above and other aspects, features and advantages of the present invention will be more apparent from the following detailed description taken in conjunction with the accompanying drawings, in which:

FIGS. 4A to 9 illustrate operational processes of an electronic device according to an embodiment of the present invention.

DETAILED DESCRIPTION OF EMBODIMENTS OF THE INVENTION

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted for the sake of clarity and conciseness.

The present invention enables electronic devices that require charging, for example, terminals which are positioned in the neighborhood of a portable terminal and can wirelessly supply power, to wirelessly supply power to the portable terminal in a series of processes in accordance with a portable terminal's request, and thus the charging of the portable terminal can be efficiently performed. In such a wireless charging, a power supply device that supplies the power serves as a master, and a power demand device that receives the power serves as a slave.

According to the present invention, an electronic device searches for a chargeable electronic device which is positioned in the neighborhood of the electronic device, determines whether to supply or receive power in accordance with its power state and the power state of the searched electronic device, and supplies/receives the power to/from the corresponding electronic device in accordance with the result of determination.

Figure 1:
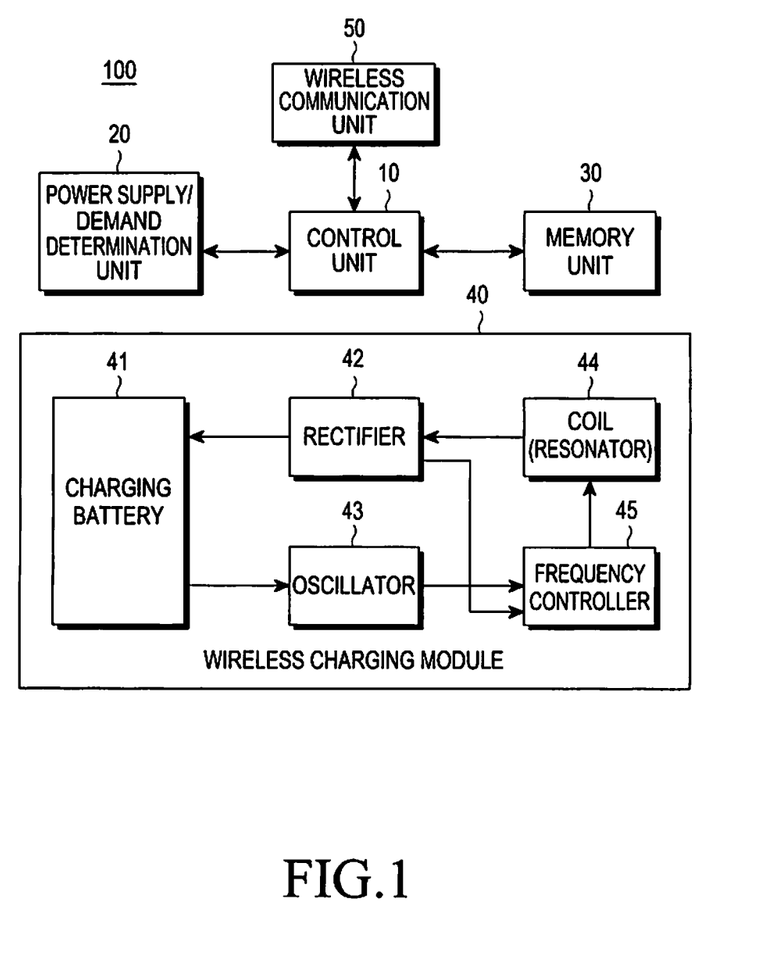
FIG. 1 illustrates the configuration of an electronic device according to an embodiment of the present invention.

An example of the configuration of an electronic device to which the present invention is applied is illustrated in FIG. 1. The electronic device may be, for example, a portable phone, a Personal Data Assistant (PDA), a notebook computer, a personal computer, a portable terminal, or various types of home devices.

Referring to FIG. 1, a wireless charging apparatus provided in an electronic device 100 according to an embodiment of the present invention includes a control unit 10, a power supply/demand determination unit 20, a memory unit 30, a wireless charging module 40, and a wireless communication unit 50.

The control unit 10 controls the entire operation of the electronic device 100, and controls the operation of respective configuration units included in the wireless charging apparatus according to the present invention.

The memory unit 30 stores, for example, programs for processing and controlling through the control unit 10, reference data, various types of updatable storage data, data received externally, and data generated according to a user's input, and provides such data to a working memory of the control unit 12. The memory unit 13 stores power information of the electronic device 100. Power information includes a charge necessary reference value, a marginal power reference value, and a residual power amount. The residual power amount is a remaining power amount of the electronic device 100 that is checked in real time or periodically. The charge necessary reference value is a power value that is a reference value for determining whether the charging is necessary, and the marginal power reference value is a power value that is a reference value for determining whether the corresponding electronic device can provide the power to another electronic device. The charge necessary reference value and the marginal power reference value may differ for respective electronic devices.

The wireless communication unit 50 transmits/receives various types of information and messages required in a wireless charging process through a short-distance wireless communication under the control of the control unit 10, and for example, may be a Bluetooth module, or a Radio Frequency Identification (RFID) communication device. It may be assumed that the wireless communication unit 50 is an RFID communication device, and thus the wireless communication unit 50 may include an RFID reader and an RFID tag.

The wireless charging module 40 supplies or receives the power, and may be configured, for example, according to any one of the electromagnetic induction type, the resonance type, and the wave radiation type or according to another wireless power providing type. It is assumed that the wireless charging module 40 is configured according to the resonance type. In this case, the wireless charging module 40 includes a charging battery 41, a rectifier 42, an oscillator 43, a coil (resonator), and a frequency controller 45.

Wirelessly supplied power is stored in the charging battery 41. The power stored in the charging battery 41 may be provided to another electronic device through the oscillator 43. In other words, the power stored in the charging battery 41 is converted so that it is oscillated with a preset oscillation frequency by the oscillator 43, and is wirelessly provided to another electronic device through an antenna having a resonance frequency that coincides with the oscillation frequency, that is, a coil (resonator) 44. The oscillation frequency may be, for example, an RFID frequency of 13.56 MHz. Since the optimum resonance frequency may be changed by an external condition, the frequency converter 45, in order to heighten the wireless charging efficiency, converts the resonance frequency of the coil (resonator) 44 under the control of the control unit 10 or the oscillator 43. Also, the coil (resonator) 44 receives the power wirelessly provided from another electronic device, and the received power is stored in the charging battery 41 through the rectifier 42.

If a certain electronic device is positioned within a wirelessly chargeable distance, the control unit 10 wirelessly supplies the power by exchanging an Identification (ID) or the like through the wireless communication unit 50, or performs a discovery process for confirming whether the electronic device is a device that can wirelessly supply or receive the power. Even if the certain electronic device can wirelessly supply or receive the power, an authentication process for confirming whether the device is suitable to the wireless charging determined by manufacturing companies or rules may be additionally performed.

In order to determine the power supply device that wirelessly supplies the power and the power demand device that wirelessly receives the power from the electronic device 100 and the searched electronic device during the wireless charging, the control unit 10 exchanges the status information with the searched electronic device through the wireless communication unit 50. The status information includes a residual power amount of each electronic device, a providable power amount, a charge necessary reference value, and a marginal power reference value.

The status information received from the searched electronic device is transferred to the power supply/demand determination unit 20, and the power supply/demand determination unit 20 determines the power supply device and the power demand device based on the status information. In the present invention, the determination of the power supply device and the power demand device may be performed by a certain power supply device that has searched for the neighboring electronic devices or by an electronic device searched for by another electronic device.

Diverse references may be provided in determining the power supply device and the power demand device. For example, the power amount that can be provided by an electronic device and the power amount that can be provided by the searched electronic device are compared with each other, and the electronic device having a relatively large amount of power that can be provided may be determined as the power supply device, and the electronic device having a relatively small amount of power that can be provided may be determined as the power demand device. Also, in consideration of the residual power amount of each electronic device, the providable power amount, the charge necessary reference value, and the marginal power reference value, the electronic device having a relatively high power occupancy rate may be determined as the power supply device, and the electronic device having a relatively low power occupancy rate may be determined as the power demand device.

The power occupancy rate represents the correlation between the power amount that is required for the corresponding electronic device to stably operate and the residual power amount or providable power amount. In another example, if the residual power amount of a certain electronic device is infinite, the corresponding electronic device may be determined as the power supply device. The electronic device of which the residual power amount is infinite is an electronic device that receives the power by wire. Furthermore, a device which urgently requires the power can receive the power regardless of the power amounts possessed by the respective devices through including of the emergence situation of the corresponding device when the devices initially exchange their IDs.

The power supply/demand determination unit 20 transfers the contents of determination to the control unit 10, and the control unit 10 determines whether to operate the wireless charging module 40 in a power supply mode or in a power demand mode in accordance with the contents of determination.

In an embodiment of the present invention, the power supply/demand determination unit 20 may be included in the control unit 10, and may perform the discovery and authentication processes of the control unit 10.

Figure 2:
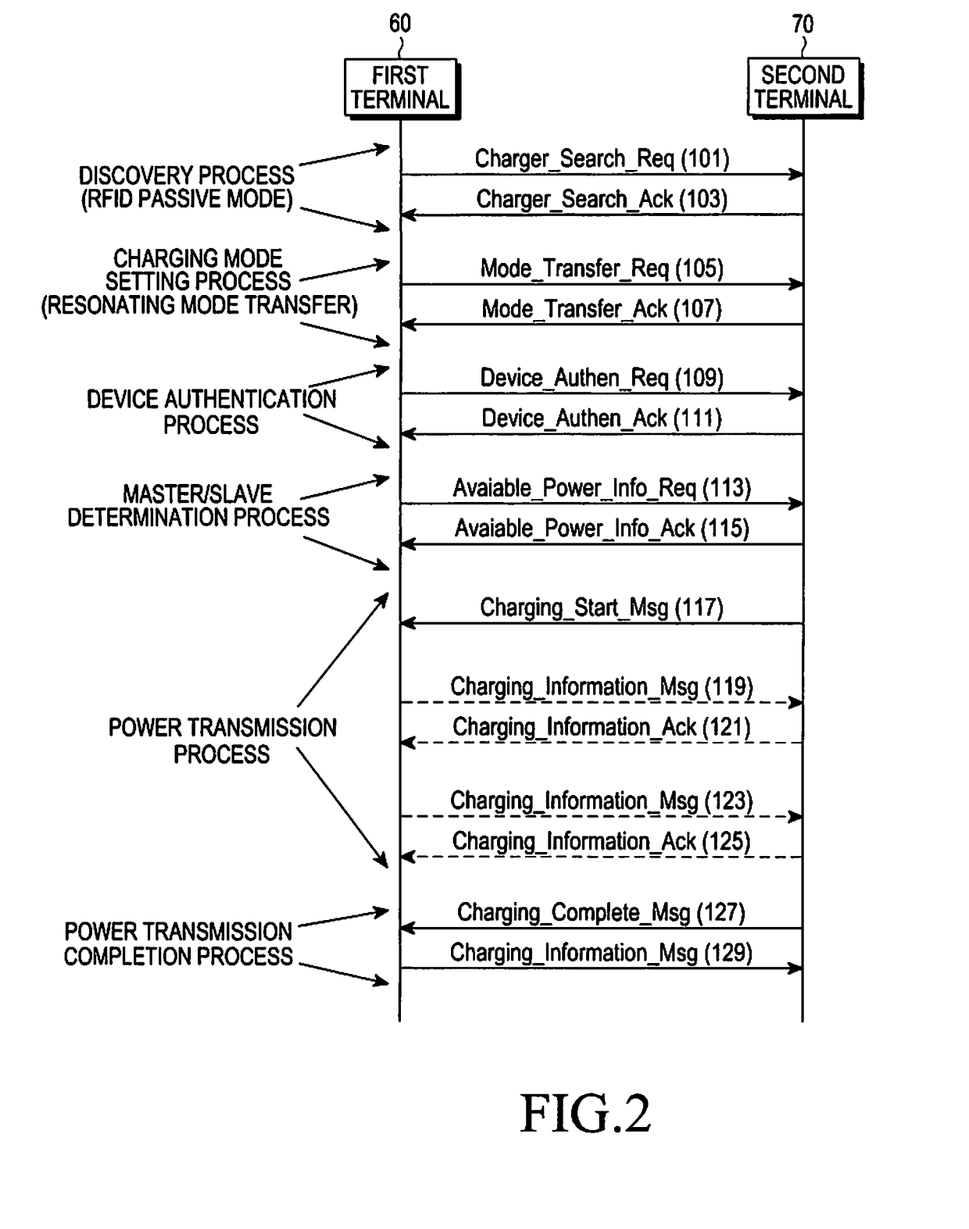
FIGS. 2 and 3 illustrate message transmission/reception processes between two electronic devices according to an embodiment of the present invention.
Figure 3:
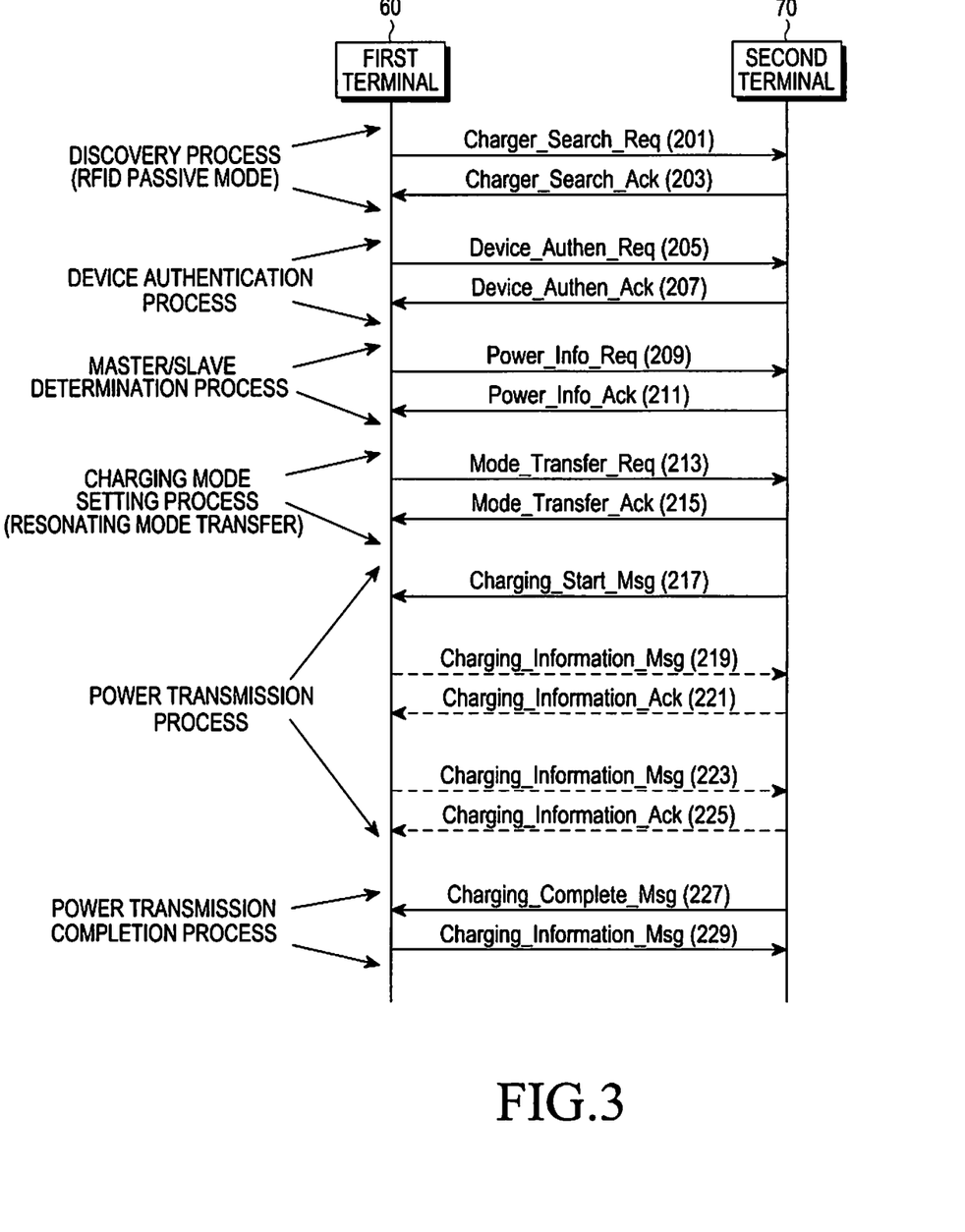

FIGS. 2 and 3 illustrate the message transmission/reception processes between two electronic devices according to an embodiment of the present invention. It is assumed that a first terminal 60 and a second terminal 70 as illustrated in FIGS. 2 and 3 are electronic devices including power charging apparatuses as illustrated in FIG. 1, and the two terminals are positioned within a wirelessly communicable range or within a wirelessly chargeable distance.

Referring to FIG. 2, the first terminal 60 performs a discovery process for finding a neighboring wirelessly chargeable electronic device in steps 101 and 103. That is, the first terminal broadcasts a search request message Charger_Search_Req through the wireless communication unit 50 in step 101. At this time, the search request message includes an identification ID of the first terminal 60. The identification ID is an inherent identifier of the first terminal 60 which represents that the first terminal 60 is an electronic device that can wirelessly charge and supply the power. The search request message may be transmitted when it is determined that the power receiving is required or when it is determined that the power supply to another electronic device becomes possible.

The second terminal 70, which has received the search request message, recognizes that the first terminal 60 is positioned in the neighborhood, and transmits a search request response message Charger_Search_Ack including its identification ID to the first terminal 60 in step 103.

Thereafter, the first terminal 60 and the second terminal 70 perform a wireless charging mode setting process in steps 105 and 107. That is, if the search request response message is received, the first terminal sets a charging mode, and transmits a mode transfer request message Mode_Transfer_Req to the second terminal 70 in step 105. The mode transfer request message may include set variables which should be set in the wireless charging module 40 to wirelessly transmit/receive the power. The wireless charging module 40 is implemented in the resonance type, and thus it may include the set variables such as a charging band, and frequency. These set variables are set in the wireless charging module 40 when the wireless charging is later determined.

The second terminal 70, which has received the mode transfer request message, sets the wireless charging mode, and transmits the mode transfer response message Mode_Transfer_Req to the first terminal 60 in step 107.

In the above-described embodiment, the set variables of the first terminal 60, which are required when the power is wirelessly transmitted/received, are included in the mode transfer request message to be transferred to the second terminal 70. However, in another embodiment, the set variables of the second terminal 70 may be included in the mode transfer response message to be transferred to the first terminal 60.

If the mode transfer request response message is received, the first terminal 60 and the second terminal 70 perform a device authentication process in steps 109 and 111. That is, when the mode transfer request response message is received, the first terminal 60 transmits an authentication request message Device_Authen_Req that includes authentication information in step 109 to the second terminal 70 in step 111. If the authentication is completed through the authentication process using the authentication information included in the authentication request message, the second terminal 70 transmits an authentication request response message Device_Authen_Ack to the first terminal 60 to terminate the authentication procedure. The simplest procedure is adopted herein, and an additional process may be required according to the security level. For example, as the authentication information of the second terminal 70 is included in the authentication request response message, even the first terminal 60 may be configured to perform the authentication process.

After the completion of the authentication process, the first terminal 60 and the second terminal 70 perform a master/slave determination process in steps 113 and 115. The electronic device that is determined as the power supply device serves as a master, and the electronic device that is determined as the power demand device serves as a slave. That is, the first terminal transmits a status information message Power_Info_Req that includes the status information related to the power state of the first terminal 60 to the second terminal 70. The status information includes the residual power amount, the charge necessary reference value, and the marginal power reference value of the first terminal 60, and may further include a required power amount, a providable power amount, and the like. The second terminal 70, which has received the status information message, determines the power supply device and the power demand device from the first terminal 60 and the second terminal 70 based on its residual power amount, the marginal power reference value, a charge necessary reference value, and information included in the received status information message. For example, the second terminal 70 compares the providable power amounts of the respective terminals, determines the terminal having a large power amount that can be provided as the power supply device, and determines the terminal having a low power amount that can be provided as the power demand device. Also, the second terminal 70 calculates and determines the power amount that can be provided by the terminal which has been determined as the power supply device.

The second terminal transmits a power information confirmation message Power_Info_Ack including the contents of determination to the first terminal 60 in step 115.

The determination of the power supply device and the power demand device and the determination of the providable power amount may be performed by the first terminal 60. In this case, the first terminal 60 requests power status information from the second terminal 70 by transmitting a power status information message to the second terminal 70, the second terminal 70 transmits a status information response message that includes the power status information of the second terminal 70, and the first terminal 60 performs determination of the power supply device and the power demand device and determination of the providable power amount based on the collected information.

In the embodiment of FIG. 2, it is assumed that the second terminal 70 is determined as the power supply terminal, and the first terminal 60 is determined as the power demand terminal. In other words, the residual power amount of the second terminal 70 is greater than or equal to the marginal power reference value of the second terminal 70, and is also less than the residual power amount of the first terminal 60. It is assumed that the residual power amount of the first terminal 60 is less than the charge necessary value of the first terminal 60.

If the determination and report of the power supply device and the power demand device is completed, a power transmission process is performed in steps 117 to 125. That is, in steps 105 and 107, the two terminals 60 and 70 set their wireless charging modules 40 using the transmitted set variables, and one of the electronic devices transmits a charging start message Charging_Start_Msg. Also, in the process of wirelessly transmitting/receiving the power, one electronic device transmits a charging information message Charging_Information_Msg for guiding the power providing particulars, and the other electronic device transmits a charging information confirmation message Charging_Information_Ack as a response. The charging information message and the charging information confirmation message may be used to indicate the total charging information to the user, and help the user determine power interruption when the power transmission is unexpectedly stopped.

Accordingly, in step 117, the second terminal 70 transmits the charging start message to the first terminal 60, and wirelessly provides the power. Also, in step 119, the first terminal 60 transmits the charging information message that includes the charging information such as the provided power amount or the like to the second terminal 70. The second terminal 70 transmits a response message to the first terminal 60 in step 121, and such processes are repeated until the charging is completed (steps 123 and 125).

If the charging is completed, the power transmission completion process is performed as in steps 127 and 129. That is, after transmitting the initially determined power supply amount, the second terminal 70 transmits a power transmission completion message Charging_Complete_Msg in step 127, and the first terminal 60, which has received this message, transmits a power transmission completion confirmation message Charging_Complete_Ack that includes the final power reception report to the second terminal 70 in step 129.

In an embodiment of the present invention, a device authentication may be also performed in the discovery process. Further, a charging mode setting process may be performed after the discovery process, the authentication process, and the master/slave determination process are completed. FIG. 3 is a diagram illustrating the above-described embodiment of the present invention. In FIG. 3, it is also assumed that the second terminal 70 is determined as the power supply device.

In FIG. 3, steps 201 to 207 are the same as the above-described steps 101 to 107. However, if the authentication process is completed in steps 205 and 207, the first terminal 60 and the second terminal 70 determine the master/slave by performing steps 209 and 211, which are similar to steps 113 and 115. If the power supply device and the power demand device are determined through steps 209 and 211, the first terminal 60 and the second terminal 70 set a charging mode by collecting set variables through transmission/reception of a mode transfer request message and a mode transfer response message in steps 213 and 215.

After the power supply device and the power demand device are determined, the second terminal 70 transmits a charging start message to the first terminal 60 in step 217. The second terminal 70 transmits a charging information message to the first terminal 60 in step 219 as it wirelessly supplies the power. At this time, the charging information message may include information on the provided power amount. The first terminal 60, which has received the charging information message, transmits the charging information response message to the second terminal 70 in step 221. This process is repeated until the charging is completed (steps 223 and 225).

After transmitting the initially determined power supply amount, the second terminal 70 transmits a power transmission completion message in step 227, and the first terminal 60, which has received this completion message, transmits a power transmission completion confirmation message that includes the final power reception report to the second terminal 70 in step 229.

FIGS. 2 and 3 illustrate the basic wireless charging process according to an embodiment of the present invention, and various scenarios may exist in accordance with the power state or configuration of the electronic device.

For example, in order for the electronic device that requires the power reception to find the electronic device that will provide the power, the search process may be first performed, while in order for the electronic device that can supply the power to find the electronic device that requires the power, the search process may be first performed. In the present invention, in an active power demand the electronic device requiring the power reception first starts the search process, and in a passive power demand the electronic device that can supply the power first starts the search process. The active power demand is suitable when the electronic device that requires the power reception has some residual power. However, in the electronic device that has virtually no residual power, it is difficult to actively search for a neighboring device, and thus it is preferable to receive the passive power supply.

Also, the operational scenario may be configured when the wireless communication unit 50 is composed of a wakeup circuit such as RFID, and otherwise. When the wireless communication unit 50 has a wakeup circuit, the electronic device in a sleep state can be awaken by the approach of another electronic device, and thus it is not required that the electronic device is continuously in a reception standby state in order to receive a search message or is periodically set to be in the reception standby state.

The operation of the electronic device may be divided into four cases in accordance with the active power demand, the passive power demand, and whether the wireless communication unit 50 is provided with a wakeup circuit, and the operational processes in the respective cases may slightly differ.

Figure 4A:
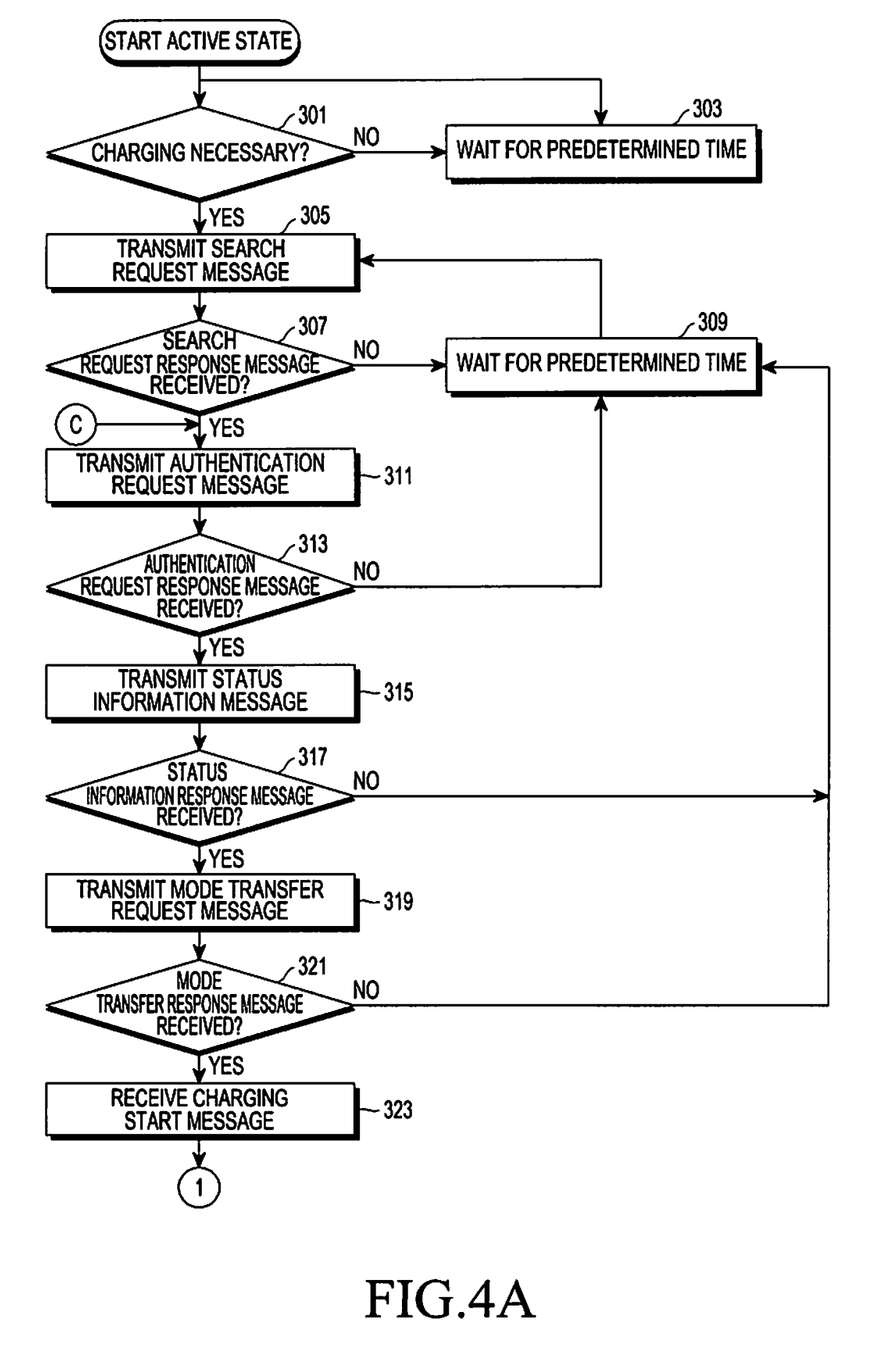
Figure 4B:
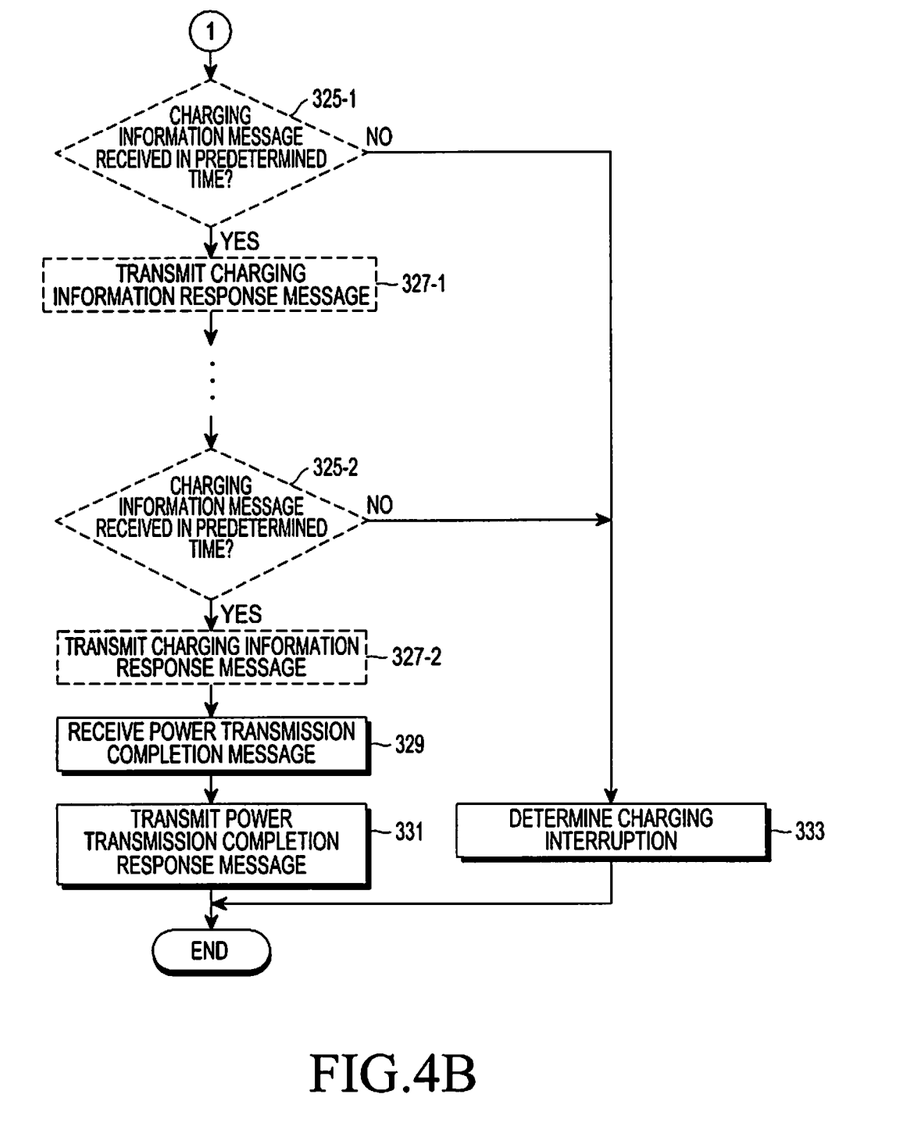
Figure 5A:
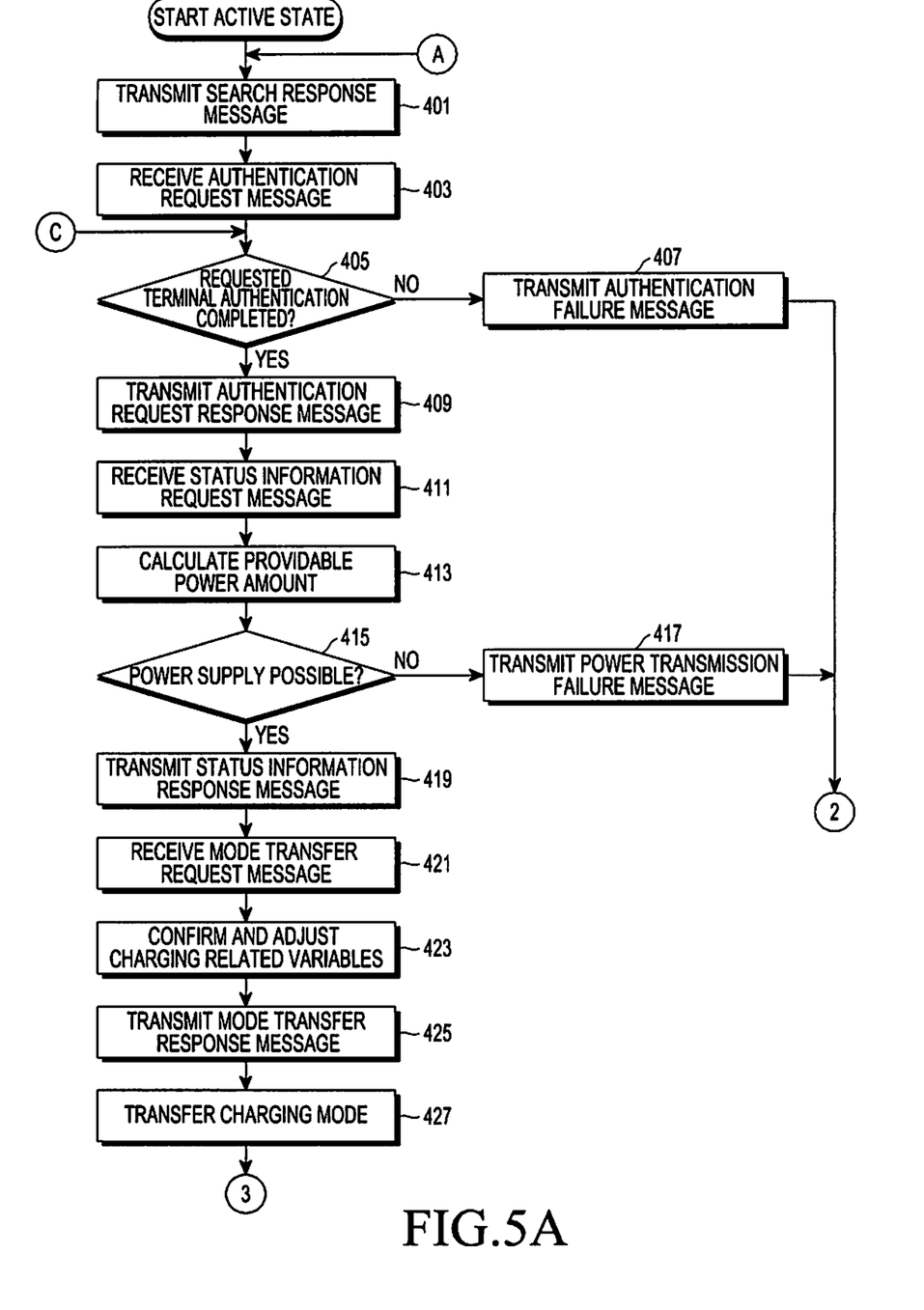
Figure 5B:
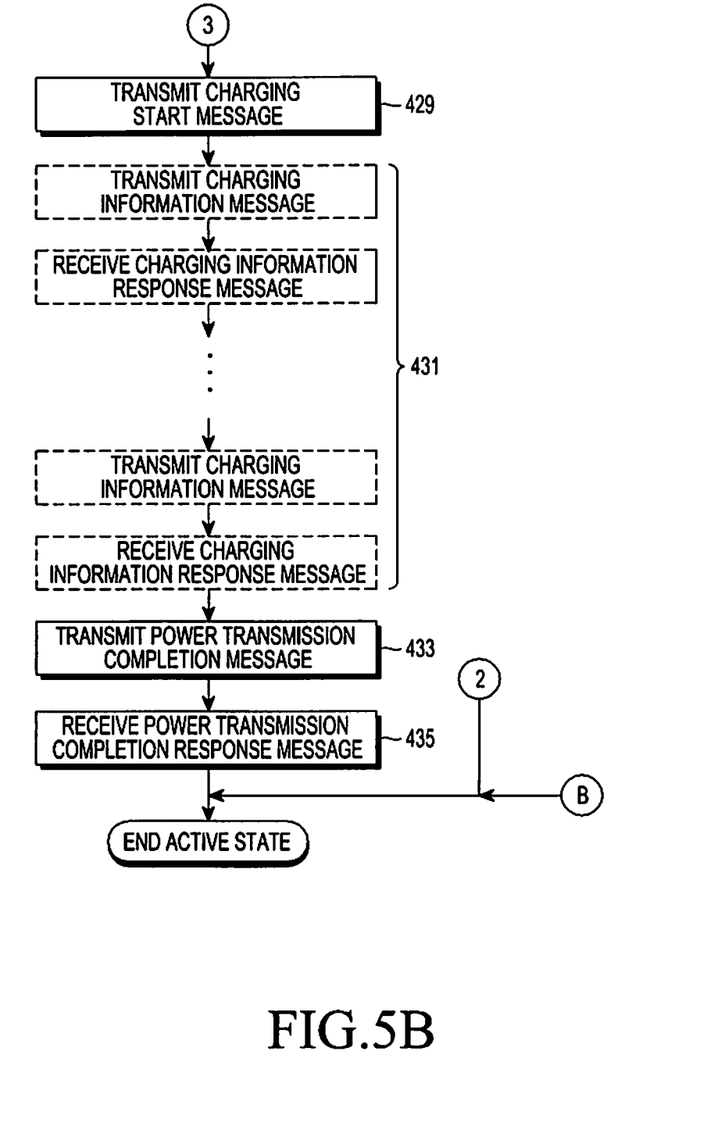
Figure 6:
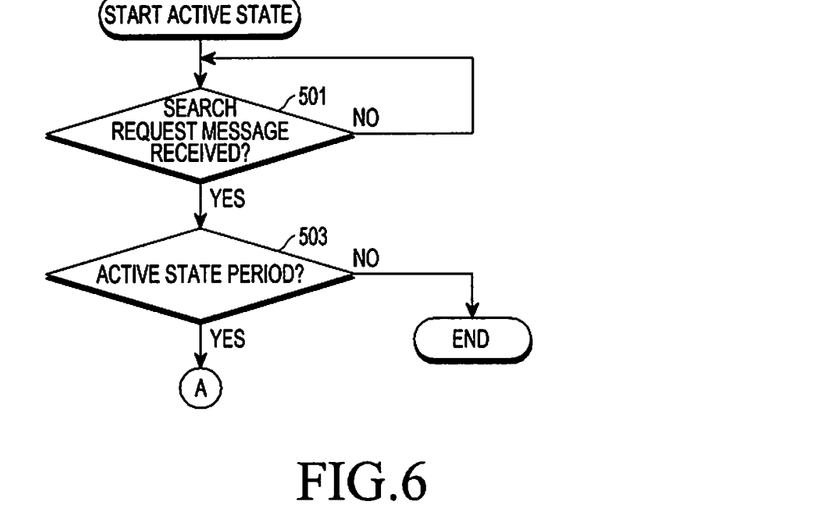
Figure 7:
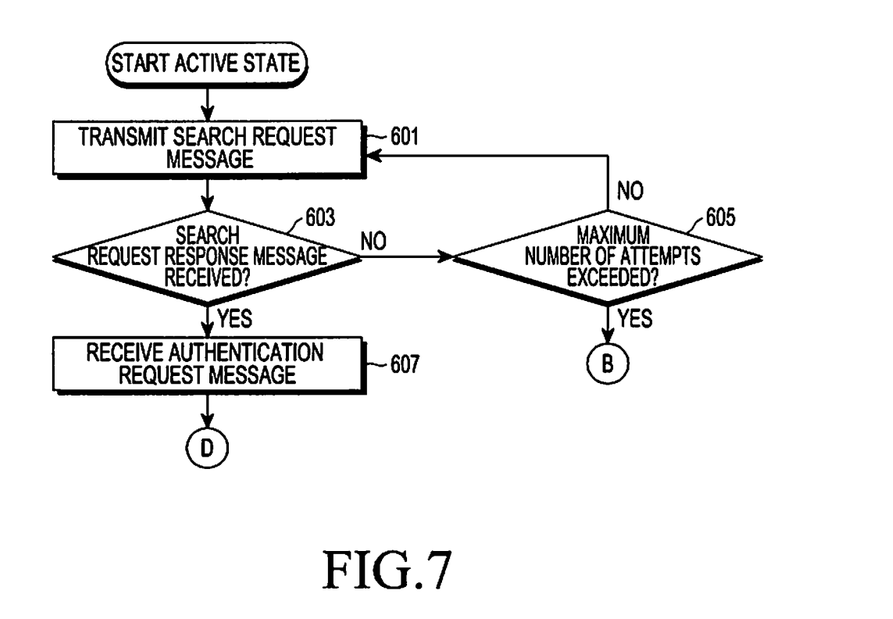
Figure 8:
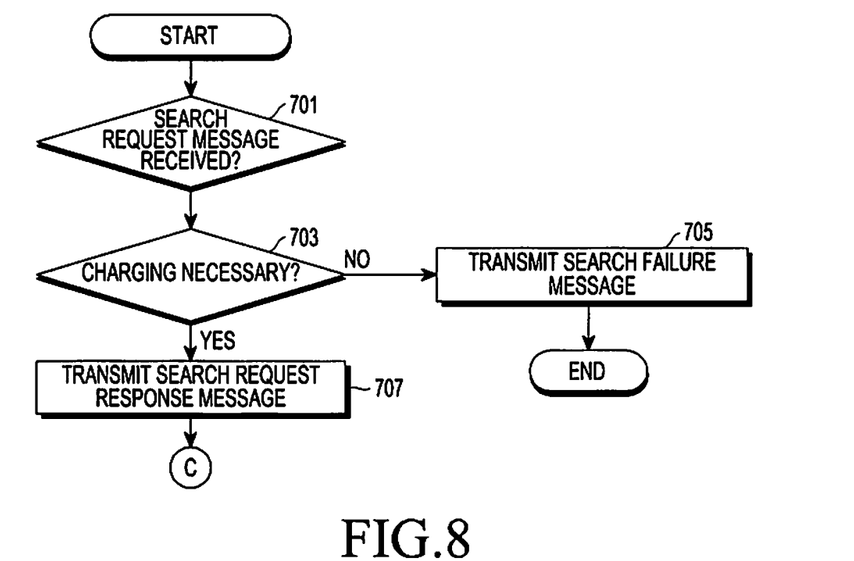
Figure 9:
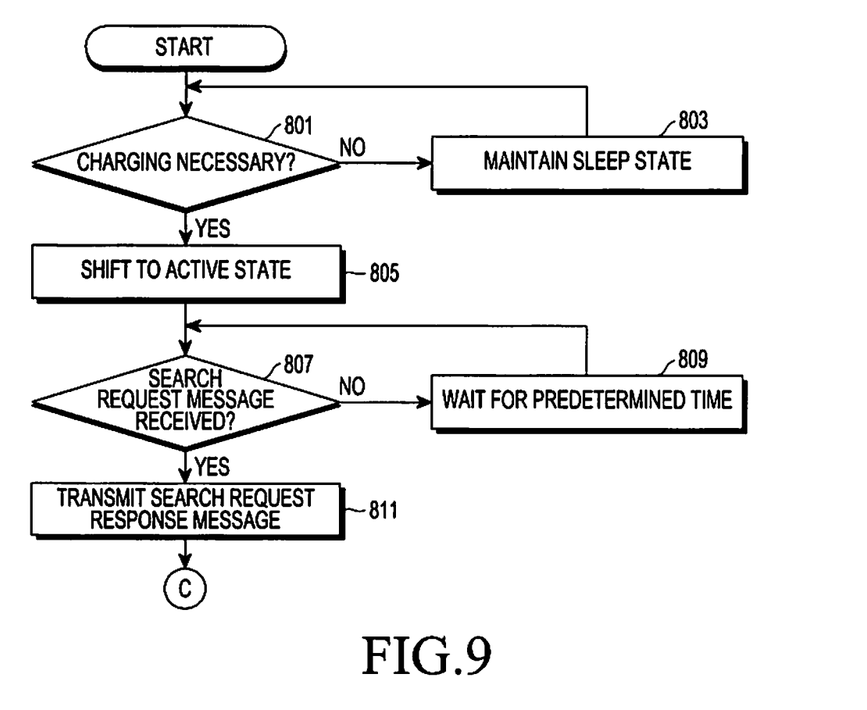

(First case) Wakeup circuit provided, active power demand (Second case) No wakeup circuit, active power demand (Third case) Wakeup circuit provided, passive power demand (Fourth case) No wakeup circuit, passive power demand FIGS. 4A to 9 illustrate the operational process of the electronic device according to the above-described four cases. FIGS. 4A and 4B illustrate the operational process of the electronic device corresponding to the power demand device according to the first case, and FIGS. 5A and 5B are diagrams illustrating the operational process of the electronic device corresponding to the power supply device according to the first case. FIG. 6 illustrates the operational process of the electronic device corresponding to the power supply device according to the second case. FIG. 7 illustrates the operational process of the electronic device corresponding to the power supply device according to the third case, and FIG. 8 illustrates the operational process of the electronic device corresponding to the power demand device according to the third case. FIG. 9 illustrates the operational process of the electronic device corresponding to the power demand device according to the fourth case.

In the embodiments as illustrated in FIGS. 4A to 9, the providable power amount is used based on the power supply device and the power demand device according to an embodiment of the present invention.

First, referring to FIGS. 4A to 5B, the operational process according to the first case will be described. In FIGS. 4A to 5B, the electronic device of which the current power state is a state where charging is necessary searches for a neighboring electronic device that can supply the power and requests the power. It is assumed that the wireless communication unit 50 of the electronic device that attempts to perform the search and the searched electronic device are provided with wakeup circuits such as RFID systems, respectively. For the sake of convenience, it is assumed that the electronic device that attempts to perform the search is a first electronic device, and the searched electronic device is a second electronic device.

Referring to FIG. 4A, the first electronic device confirms the current power amount in real time or periodically in step 301, and if the residual power amount is greater than or equal to the charge necessary reference value, the first electronic device proceeds to step 303 to wait for a predetermined time. If the residual power amount is less than the charge necessary reference value as a result of confirmation in step 301, the first electronic device determines that the charging is necessary, proceeds to step 305, and periodically transmits a wakeup signal that includes a search request message. Also, in steps 307 and 309, the first electronic device waits for the reception of a search request response message for a predetermined time.

Accordingly, the second electronic device, which is positioned within an effective distance of the wakeup signal in the neighborhood of the first electronic device, receives the wakeup signal of the first electronic device, and the wakeup circuit is shifted to an active state. Even if the second electronic device is in a sleep state when the wakeup signal is received, such an operation is normally performed. If the active state starts, the second electronic device, as illustrated in FIG. 5A, transmits a search request message to the first electronic device in step 401, and the first electronic device receives the search request response message in step 307. If the search request response message is not received in step 307, the first electronic device proceeds to step 309, waits for a predetermined time, and proceeds to step 305 to re-transmit the search request message.

The first electronic device, which has received the search request response message, proceeds to step 311 and transmits an authentication request message to the second electronic device. Accordingly, the second electronic device, which has received the authentication request message in step 403 of FIG. 5A, proceeds to step 405 and performs the authentication process. If the authentication is normally completed as a result of performing the authentication process in step 405, the second electronic device proceeds to step 409, and transmits the authentication request response message. If the authentication is not normally completed, the second electronic device proceeds to step 407 and transmits an authentication failure message.

As the second electronic device transmits the authentication request response message in step 409, the first electronic device receives the authentication request response message in step 313, proceeds to step 315, and transmits a status information message to the second electronic device. The status information message includes the residual power amount of the first electronic device, the charge necessary reference value, and the required power amount. If the authentication request response message is not received in step 313, the first electronic device proceeds to step 309, waits for a predetermined time, and proceeds to step 305 to re-transmit the search request message.

The second electronic device, which has received the status information message of the first electronic device in step 411, proceeds to step 413, and determines whether the power supply is possible by confirming whether its residual power amount is greater than or equal to the marginal power reference value. Also, with reference to the power status information of the first electronic device included in the received status information message, the second electronic device confirms whether the first electronic device requires the power receiving.

If the second electronic device can supply the power and the first electronic device requires the power reception as a result of confirmation, the second electronic device is determined as the power supply device and the first electronic device is determined as the power demand device, and then the providable power amount of the second electronic device is calculated to proceed to step 415. If the second electronic device requires the power reception and the first electronic device can supply the power as a result of confirmation, the second electronic device is determined as the power demand device and the first electronic device is determined as the power supply device, and then the providable power amount of the first electronic device is calculated to proceed to step 415. If both the first electronic device and the second electronic device can supply the power, the device having a relatively large power amount is determined as the power supply device, and the device having a relatively low power amount is determined as the power demand device. If both the first electronic device and the second electronic device require the power reception, the providable power amount is not calculated, and it is judged that the power providing is not possible.

According to the first case, since the first electronic device requires the charging and the wireless charging operation starts, the first electronic device is determined as the power demand device and the second electronic device is determined as the power supply device in step 413. Also, the power amount that can be provided by the second electronic device is calculated.

Then, the second electronic device proceeds to step 415, and if the power supply is impossible, the second electronic device transmits a power transmission failure message to the first electronic device, and ends the active state. However, if the power supply is possible, the second electronic device proceeds to step 419, and transmits a status information response message that includes the contents determined in step 413 to the first electronic device.

Accordingly, the first electronic device receives the status information response message in step 317, proceeds to step 319, and transmits a mode transfer request message to the second electronic device.

If the mode transfer request message is received in step 421, the second electronic device proceeds to step 423, confirms charging-related set variables included in the mode transfer request message, and thus sets the set variable values of the wireless charging module 40. The second electronic device transmits the mode transfer response message to the first electronic device in step 425, and transfers the present mode to a charging mode in step 427. Thereafter, the second electronic device transmits a charging start message in step 429 of FIG. 5B.

The first electronic device receives the mode transfer response message in step 321, and receives the charging start message in step 323. Thereafter, the second electronic device wirelessly transmits/receives the power in step 431, while the first electronic device wirelessly transmits/receives the power in steps 325 and 327.

That is, the second electronic device transmits the charging information message to the first electronic device in step 431 as it wirelessly provides the power, and if the charging information message is received within a predetermined time in step 325-1 in FIG. 4B, the first electronic device transmits a charging information response message in step 327-1 in response to the received charging information message. Accordingly, the second electronic device receives the charging information response message, and this operation is repeated until the wireless charging is completed. If the charging information message is not received within the predetermined time, the first electronic device determines that the charging is interrupted in step 333.

If the wireless charging is completed, the second electronic device transmits a power transmission completion message to the first electronic device in step 433 in FIG. 5B, and the first electronic device receives the power transmission completion message in step 329. Also, the first electronic device transmits a charging completion response message in step 331, and the second electronic device receives the charging completion response message in step 435 and ends the active state.

Referring to FIG. 6, the operational process according to the second case will be described. In FIG. 6, as in the embodiment as illustrated in FIGS. 4A to 5B, the electronic device, of which the current power state is a state where the charging is necessary, searches for a neighboring electronic device that can supply the power and requests the power. However, the second case is different from the first case in that the wireless communication unit 50 of the specified searched electronic device is not provided with a wakeup circuit, and thus the specified electronic device always or periodically maintains the active state to wait for the reception of the search request message. Thus, the specified electronic device shifts the state of the wireless charging module 40 from a sleep state to an active state periodically or by an event. The event may occur by various sensing information such as a user's input or an operation of the specified electronic device. If the specified electronic device is a not connected to the power, it may maintain the active state.

Thus, the operational process of the electronic device that attempts to perform the search in the operational processes of the respective electronic devices, for example, a third electronic device, is the same as that as illustrated in FIGS. 4A and 4B, but the searched electronic device, for example, a fourth electronic device, operates as shown in FIG. 6.

Referring to FIG. 6, if the search request message is received from the third electronic device in step 501, the fourth electronic device confirms whether the current state period is an active state period in step 503. If the current state period is the active state period, the fourth electronic device proceeds to step 401 of FIG. 5A, and operates in a similar manner to the operational process as illustrated in FIGS. 5A and 5B.

In particular, in the embodiment according to the second case, since the third electronic device requires the charging and thus the wireless charging operation starts, the third electronic device is determined as the power demand device and the fourth electronic device is determined as the power supply device in step 413. The power amount that can be provided by the fourth electronic device is calculated.

In the third case, the electronic device that can currently supply the power to another device, for example, a fifth electronic device, searches for a neighboring device that requires the power and provides the power to the searched device. It is assumed that the electronic device that receives the power is provided with a wakeup circuit. For the sake of convenience, it is assumed that the electronic device that is searched according to a search process of the fifth electronic device is a sixth device.

The wireless charging module of the fifth electronic device shifts its state from a sleep state to an active state periodically or by an event. If the fifth electronic device is not connected to the power, it may always maintain the active state. The fifth electronic device sends the search request message in order to find whether an electronic device that requires the power reception exists in the neighborhood in step 601 of FIG. 7. The search request message is included in the wakeup signal to be transmitted.

Accordingly, the sixth electronic device that is positioned in the neighborhood of the fifth electronic device reacts on the wakeup signal sent by the fifth electronic device and shifts the current state from a sleep state to an active state in step 701 of FIG. 8. Then, the sixth electronic device determines whether the charting is required in step 703, and if the charging is not required, the sixth electronic device transmits a search failure message to the fifth electronic device in step 705. If the charging is required, the sixth electronic device proceeds to step 707, and transmits a search request response message to the fifth electronic device. Also, the sixth electronic device proceeds to step 311 of FIG. 4A and transmits an authentication request message to the fifth electronic device. Thereafter, the sixth electronic device operates in the process as illustrated in FIG. 4B.

If the search request response message in step 603 is received in step 707, the fifth electronic device proceeds to step 607 of FIG. 7 to receive the authentication request message in step 311 of FIG. 4A, and proceeds to step 405 of FIG. 5A to perform the wireless charging operation as illustrated in FIGS. 5A and 5B. If the search request response message is not received for a predetermined time, the fifth electronic device proceeds to step 605, and confirms whether the number of search attempts exceeds the maximum number of search attempts. If the number of search attempts exceeds the maximum number, the fifth electronic device ends the operational process, while if not, the fifth electronic device proceeds to step 601 to transmit the search request message again.

In the embodiment according to the third case, since fifth electronic device starts the wireless charging operation to provide the power to another device, the sixth electronic device is determined as the power demand device and the fifth electronic device is determined as the power supply device in step 413. The power amount that can be provided by the fifth electronic device is calculated.

In the fourth case, the electronic device that can currently supply the power to another device searches for a neighboring device that requires the power and provides the power to the searched device. However, it is assumed that the electronic device that receives the power is not provided with a wakeup circuit. In this case, the operation of the device that searches for the neighboring electronic device is the same according to the third case, and the searched electronic device, for example, the seventh electronic device, operates as illustrated in FIG. 9.

Referring to FIG. 9, the seventh electronic device determines whether the charging is necessary by confirming the residual power amount in step 801. If it is determined that the charging is not necessary, the seventh electronic device proceeds to step 803 to maintain the wireless charging module 40 in a sleep state, while if it is determined that the charging is necessary, the seventh electronic device proceeds to step 805 to shift to the active state. Then, the sixth electronic device proceeds to step 807 to confirm whether the search request message is received, and if the search request message is received, the sixth electronic device proceeds to step 811 where the seventh electronic device transmits the search request response message to the corresponding electronic device, and proceeds to step 311 of FIG. 4A to transmit the authentication request message. Thereafter, the sixth electronic device performs the wireless charging operation in the operational process as illustrated in FIGS. 4A and 4B.

In the embodiment according to the fourth case, since the seventh electronic device starts the wireless charging operation to provide the power to another device, the seventh electronic device is determined as the power demand device, and the searched electronic device is determined as the power supply device in step 413. Also, the power amount that can be provided by the seventh electronic device is calculated.

According to the present invention, since the electronic devices that can wirelessly supply or receive the power are determined as the power supply device and the power demand device based on their residual power amounts, and the power charging is performed accordingly, the charging can be easily performed when necessary. Also, message exchange processes of diverse scenarios can be provided between two electronic devices for the wireless charging.

Also, wireless charging can be performed between the electronic devices even without a support for supplying the power, and the power can be wirelessly supplied or received in accordance with the power state of the electronic devices.

While the invention has been shown and described with reference to the embodiments thereof, various modifications may be made without departing from the scope of the invention. For example, although it is exemplified that one electronic device is searched for in the above-described embodiments, a search for two or more electronic devices may be performed. In this case, the power supply device or the power demand device is determined in consideration of the power amount that can be provided by the respective electronic devices or a power occupancy rate. Accordingly, the scope of the invention is not defined by the above-described embodiments, but should be defined by the appended claims and their equivalents.

What is claimed is:

1. A wireless charging method of a first electronic device, comprising:
  searching for at least one second electronic device, wherein the at least one second electronic device is chargeable;
  obtain status information related to a power state of the at least one second electronic device and the first electronic device;
  identifying whether the first electronic device is a power supply electronic device or a power demand electronic device, based on the obtained status information;
  receiving power, from the at least one second electronic device, based on a providable power amount determined by the at least one second electronic device, if the first electronic device is identified as the power demand electronic device;
  repeatedly receiving a charging information message from the at least one second electronic device while receiving the determined providable power amount;
  if the charging information message is not received from the at least one second electronic device within a predetermined time, identifying that the wireless charging is interrupted; and
  if the charging information message is received from the at least one second electronic device within the predetermined time, transmitting a charging information response message,
  wherein the charging information message includes information indicating an amount of power applied by the second electronic device.

2. The wireless charging method as claimed in claim 1, further comprising supplying the power to the at least one second electronic device based on a providable power amount determined by the first electronic device, if the first electronic device is identified as the power supply electronic device.

3. The wireless charging method as claimed in claim 1, wherein the status information includes:
  a residual power amount representing a current remaining power amount,
  a charge necessary reference value representing a power reference value for identifying whether charging is necessary, and
  a marginal power reference value representing a power reference value for identifying whether the power can be supplied to another electronic device, based on a providable power amount of the first electronic device and the providable power amount of the at least one second electronic device.

4. The wireless charging method as claimed in claim 1, wherein
  when a providable power amount of the first electronic device, which is calculated based on status information of the first electronic device, is greater than or equal to the providable power amount of the at least one second electronic device, the first electronic device is identified as the power supply electronic device, and
  when the providable power amount of the first electronic device is less than the providable power amount of the at least one second electronic device, the first electronic device is identified as the power demand electronic device.

5. The wireless charging method as claimed in claim 1, wherein an electronic device, from among the first electronic device and the at least one second electronic device, having an infinite residual power amount, is identified as a power supply electronic device.

6. The wireless charging method as claimed in claim 1, wherein an electronic device, from among the first electronic device and the at least one second electronic device, which has requested a power demand, is identified as the power demand electronic device.

7. The wireless charging method as claimed in claim 3, wherein searching for the at least one second electronic device is performed to wirelessly receive the power from the at least one second electronic device when the residual power amount of the first electronic device is less than the charge necessary reference value of the first electronic device.

8. The wireless charging method as claimed in claim 3, wherein searching for the at least one second electronic device is performed to wirelessly supply the power to the at least one second electronic device when the residual power amount of the first electronic device is greater than or equal to the marginal power reference value of the first electronic device.

9. A wireless charging apparatus for a first electronic device, comprising:
a wireless communication unit; and
a control unit configured to:
search for at least one second electronic device,
obtain status information related to a power state of the at least one second electronic device and the first electronic device,
identify whether the first electronic device is a power supply electronic device or a power demand electronic device, based on the received status information,
receive power, from the at least one second electronic device through the wireless communication unit, based on a providable power amount determined by the at least one second electronic device, if the first electronic device is identified as the power demand electronic device,
repeatedly receive a charging information message from the at least one second electronic device through the wireless communication unit while receiving the determined providable power amount, and
if a charging information message is not received within a predetermined time, identify that the wireless charging is interrupted, and
if the charging information message is received from the at least one second electronic device within the predetermined time, transmit a charging information response message,
wherein the charging information message includes information indicating an amount of power applied by the second electronic device.

10. The wireless charging apparatus as claimed in claim 9, further comprising:
a wireless charging module supplying power to the at least one second electronic device based on a providable power amount determined by the first electronic device, if the first electronic device is identified as the power supply electronic device.

11. The wireless charging apparatus as claimed in claim 9, wherein the status information includes a residual power amount representing a current remaining power amount, a charge necessary reference value representing a power reference value for identifying whether charging is necessary, and a marginal power reference value representing a power reference value for identifying whether the power can be supplied to another electronic device, based on a providable power amount of the first electronic device and the providable power amount of the at least one second electronic device.

12. The wireless charging apparatus as claimed in claim 11, wherein if the providable power amount of the first electronic device, which is calculated based on the status information of the first electronic device, is greater than or equal to the providable power amount of the at least one second electronic device, the first electronic device is identified as the power supply electronic device, and if the providable power amount of the first electronic device is less than the providable power amount of the at least one second electronic device, the first electronic device is identified as the power demand electronic device.

13. The wireless charging apparatus as claimed in claim 9, wherein an electronic device, from among the first electronic device and the at least one second electronic device, having an infinite residual power amount, is identified as a power supply electronic device.

14. The wireless charging apparatus as claimed in claim 9, wherein an electronic device, from among the first electronic device and the at least one second electronic device, which has requested a power demand, is identified as the power demand electronic device.

15. The wireless charging apparatus as claimed in claim 11, wherein the control unit performs a search for the at least one second electronic device to wirelessly receive the power from the at least one second electronic device when the residual power amount of the first electronic device is less than the charge necessary reference value of the first electronic device.

16. The wireless charging apparatus as claimed in claim 11, wherein the control unit performs a search for the at least one second electronic device to wirelessly supply the power to the at least one second electronic device when the residual power amount of the first electronic device is greater than or equal to the marginal power reference value of the first electronic device.

17. A wireless charging method of a second electronic device, comprising:
receiving a search request message from at least one first electronic device;
receiving status information related to a power state of the at least one first electronic device from the at least one first electronic device;
identifying whether the second electronic device is a power supply electronic device or a power demand electronic device, based on the received status information;
receiving power from the at least one first electronic device; based on a providable power amount determined by the at least one first electronic device, if the second electronic device is identified as the power demand electronic device;
repeatedly receiving a charging information message from the at least one first electronic device while receiving the determined providable power amount; and if the charging information message is not received from the at least one first electronic within a predetermined time, identifying that the wireless charging is interrupted, and if the charging information message is received from the at least one first electronic device within the predetermined time, transmitting a charging information response message, wherein the charging information message includes information indicating an amount of power applied by the first electronic device.

18. The wireless charging method as claimed in claim 17, further comprising supplying the power to the at least one first electronic device, based on a providable power amount determined by the second electronic device, if second electronic device is identified as the power supply electronic device.

19. A wireless charging apparatus for a second electronic device, comprising:
a wireless communication unit; and
a control unit configured to:
receive a search request message from at least one first electronic device through the wireless communication unit,
receive status information related to a power state of the at least one first electronic device from the at least one first electronic device through the wireless communication unit,
identify whether the second electronic device is a power supply electronic device or a power demand electronic device, based on the received status information,
receive power, from the at least one first electronic device through the wireless communication unit, based on a providable power amount determined by the at least one first electronic device, if the second electronic device is identified as the power demand electronic device, and
repeatedly receive a charging information message from the at least one first electronic device through the wireless communication unit while receiving the power of the determined providable power amount, and
if a charging information message is not received from the at least one first electronic device within a predetermined time, identify that the wireless charging is interrupted, and
if the charging information message is received from the at least one first electronic device within the predetermined time, transmit a charging information response message,
wherein the charging information message includes information indicating an amount of power applied by the second electronic device.

20. The wireless charging apparatus as claimed in claim 19, further comprising:
a wireless charging module supplying the power to the at least one first electronic device based on a providable power amount determined by the second electronic device, if the second electronic device is identified as the power supply electronic device.

21. The wireless charging method as claimed in claim 1, wherein the charging information message comprises at least one of information for indicating charging level and information for indicating charging connectivity state.

22. The wireless charging apparatus as claimed in claim 9, wherein the charging information message comprises at least one of information for indicating charging level and information for indicating charging connectivity state.

* * * * *